(12) United States Patent
Kapoor

(10) Patent No.: US 8,214,636 B2
(45) Date of Patent: *Jul. 3, 2012

(54) CUSTOMIZABLE PUBLIC KEY INFRASTRUCTURE AND DEVELOPMENT TOOL FOR SAME

(75) Inventor: Amit Kapoor, Palo Alto, CA (US)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,091

(22) Filed: Sep. 14, 2009
(Under 37 CFR 1.47)

(65) Prior Publication Data

US 2010/0228969 A1 Sep. 9, 2010
US 2011/0213960 A2 Sep. 1, 2011

Related U.S. Application Data

(63) Continuation of application No. 10/196,286, filed on Jul. 17, 2002, now Pat. No. 7,610,484, which is a continuation of application No. PCT/US01/01390, filed on Jan. 17, 2001.

(60) Provisional application No. 60/260,892, filed on Jan. 12, 2001, provisional application No. 60/261,169, filed on Jan. 16, 2001.

(30) Foreign Application Priority Data

Jan. 17, 2000 (CA) .................... 2296220

(51) Int. Cl.
H04L 29/06 (2006.01)
(52) U.S. Cl. ......... 713/156; 380/279; 380/282; 380/285
(58) Field of Classification Search .......... 380/279, 380/282, 285; 713/156
See application file for complete search history.

(56) References Cited

U.S. PATENT DOCUMENTS

| 5,218,637 | A | 6/1993 | Angebaud et al. |
| 5,787,172 | A | 7/1998 | Arnold |
| 6,108,788 | A | 8/2000 | Moses et al. |
| 6,499,110 | B1 | 12/2002 | Moses et al. |

OTHER PUBLICATIONS

Chokhani, S. et al.; "Internet X.509 Public Key Infrastructure Certificate Policy and Certification Practices Framework": Internet Engineering Taskforce, Network Working Group, Request for Comments 2527: Mar. 1999.

Myers, M. et al.; "Internet X.509 Certificate Request Message Format": Internet Engineenng Taskforce, Network Working Group, Request for Comments 2511: Mar. 1999.

(Continued)

*Primary Examiner* — Eleni Shiferaw
*Assistant Examiner* — Paul Callahan
(74) *Attorney, Agent, or Firm* — Blake, Cassels & Graydon LLP; Anil Bhole; John R.S. Orange

(57) ABSTRACT

A public key infrastructure comprises a client side to request and utilize certificates in communication across a network and a server side to administer issuance and maintenance of said certificates. The server side has a portal to receive requests for a certificate from a client. A first policy engine to processes such requests in accordance with a set of predefined protocols. A certification authority is also provided to generate certificates upon receipt of a request from the portal. The CA has a second policy engine to implement a set of predefined policies in the generation of a certificate. Each of the policy engines includes at least one policy configured as a software component e.g. a Java bean, to perform the discreet functions associated with the policy and generate notification in response to a change in state upon completion of the policy.

20 Claims, 7 Drawing Sheets

OTHER PUBLICATIONS

Myers, M. et al.; "Certificate Management Messages over CMS"; Internet Engineering Taskforce, Network Working Group, Request for Comments 2797; Apr. 2000.

Clark et al.; "Final Report of the DSI Workgroup"; Executive Summary; The Council of Technology Services, Commonwealth of Virginia; p. 19: Registration Authority; Oct. 30, 2000.

Bamboo, Santosh; Java Bean Components Architecture for Java; http://www.iormyx.com, Pub. Dec. 31, 1999.

Venners, Bill; "Security and the Class Loader Archecture"; JavaWorld; Aug. 1997; retrieved from http://www.artima.com/underthehood/classloadersP.htm, Pub. Aug. 1997.

Zukowski, John; Introduction to the JavaBeans API—Short Course; retrieved from http://java.sun.com/developer/onlineTraining/Beans/JBeansAPI/shortcourse.html.

CUSTOMIZABLE PUBLIC KEY INFRASTRUCTURE AND DEVELOPMENT TOOL FOR SAME

CROSS REFERENCE TO RELATED APPLICATIONS

This application is a continuation of U.S. application Ser. No. 10/196,286 filed Jul. 17, 2002 now U.S. Pat. No. 7,610,484 which is a continuation of PCT/US01/01390 filed on Jan. 17, 2001 which claims priority from Canadian Application No. 2,296,220 filed on Jan. 17, 2000, U.S. Application No. 60/260,892 filed on Jan. 12, 2001 and U.S. Application No. 60/261,169 filed on Jan. 16, 2001 the contents of which are incorporated herein by reference.

FIELD OF THE INVENTION

The present invention relates to the field of cryptography and in particular to public key infrastructures.

BACKGROUND OF THE INVENTION

Electronic commerce and communication has heightened the need to provide better ways to manage trust when using networked computing systems. The availability of manageable security services such as user authentication, data confidentiality, and user accountability are essential for deploying trustworthy Internet-based services.

Research and development in the field of public key cryptography has been the greatest source of robust and scalable security protocol solutions. Public key cryptography is the basis for a number of popular digital signature and key management schemes. These include Diffie-Hellman key agreement and the RSA, DSA, and ECDSA digital signature algorithms. Public key algorithms are typically combined with other cryptographic algorithms (e.g. DES) and security protocols (e.g. SSL) to provide a wide range of sophisticated and scalable security services such as authentication, confidentiality, and integrity.

Public key cryptography uses a pair of cryptographic keys—one private and one public. Public key cryptography provides an elegant architecture for authentication and authorization, on any kind of communication channel. The Private key is kept secret and used to create digital signatures and decrypt encrypted messages. The public key of the user can be published and used by others to confirm the validity of a digital signature or to encrypt a message to the owner of the corresponding private key.

A public-key certificate binds a public-key value to a set of information that identifies an entity (such as a person, organization, account or site) associated with use of the corresponding private key. This entity is known as the "subject" of the certificate. The binding is certified by a certificate authority (CA) who issues a certificate that can be used by subject to assure other parties of the authenticity of a communication. The certificate is used by a "certificate user" or "relying party" that needs to assure them of the accuracy of the public key distributed via that certificate and that will be used to verify a message. Without such certification, the user cannot be sure that the public key is really the public key of the subject. A certificate user is typically an entity that is verifying a digital signature from the certificate's subject or an entity sending encrypted data to the subject. The degree to which a certificate user can trust the binding embodied in a certificate depends on several factors. These factors include the practices followed by the certification authority (CA) in authenticating the subject; the CA's operating policy, procedures and security controls; the subject's obligations (e.g. to protect the private key); and the stated undertakings and legal obligations of the CA, such as warranties and limitations on liability.

The CA which issues the certificates is frequently a software application running on a server and implementing a set of protocols and policies and administering the certificates that are issued. The certificate can be signed with an asymmetric cryptographic algorithm (using a digital signature) or authenticated with a symmetric system (using a message authentication code [MAC]).

Usually a CA is responsible for several tasks. These may include, without restriction:

Receiving certificate requests
Validating that the requesting entity has control of the private key matching the requested public key (proof of possession)
Validating the conformance of the request with local policy, including restrictions on identifying information, attribute information and/or keying material.
Modifying the request to create conformance with local policy
Validating the information in the request against external data sources
Determining if the request has been authenticated by the user or some other authority
Presenting the request for manual approval by an administrator or administrators
Signing or authenticating the certificate
Publishing the certificate to a central storage point or multiple storage points
Returning the certificate to the requestor With the dramatic increase in use of public key certificates there has been recognized a need for organizations to manage the security requirements for certificate issuing and management components. This need has evolved into what is termed a Public Key Infrastructure (PKI). A public key infrastructure (PKI) is commonly defined to be the set of hardware, software, people, policies and procedures needed to create, manage, store, distribute, revoke and destroy certificates and keys based on public key cryptography, in a distributed computing system.

A certificate issuing and management system (CIMS) includes the components of the PKI that are responsible for the issuance, revocation and overall management of the certificates and certificate status information. A CIMS always includes a CA and may include Registration Authorities (RAs), a portal and other subcomponents.

A complete PKI has many components. These components are typically distributed throughout the Internet as well as within private enterprise networks. Like other network management and security components, PKI capabilities must exist to one degree or another on virtually all network clients, servers and underlying infrastructure components.

Public key infrastructure provides an efficient, scalable method of managing identity. The identity of people, devices and services can be efficiently conveyed and managed within distributed, heterogeneous network environments using PKI-based methods.

In order to be commercially viable a PKI should be able to provide a Standards-based PKI architecture, protocol interoperability arid security modeling; scalable performance and assurance to match project requirements, schedule and budget; support for rapid evaluation, customization and deployment efforts; highly-scalable and distributable registration system to match organizational needs. As the use of PKI infrastructures has increased and the number of protocols and possible configurations has increased there is a need for a system and method that minimizes PKI development, customization and deployment barriers-to-entry for Internet-based Secure Service Providers (e-commerce, banking, telecommunications); Operating System Vendors or Distributors; Independent Software Vendors (ISV); PKI System Integrators and Consultants; Trust Service Providers (TSP); Internet Service Providers (ISP); Application Service Providers (ASP); Enterprise Security Solution Providers. However, presently such infrastructure tends to be provided on a customized basis to meet particular specifications and does not readily provide the flexibility and adaptability required in current environments.

It is therefore an object of the present invention to obviate or mitigate the above disadvantages.

SUMMARY OF THE INVENTION

In general terms, the present invention provides a public key infrastructure in which each of a portal and a CA have respective policy engines, each of which includes at least one policy configured as a software component to perform the discreet functions associated with the policy and generate notification in response to a change in state upon completion of the policy.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
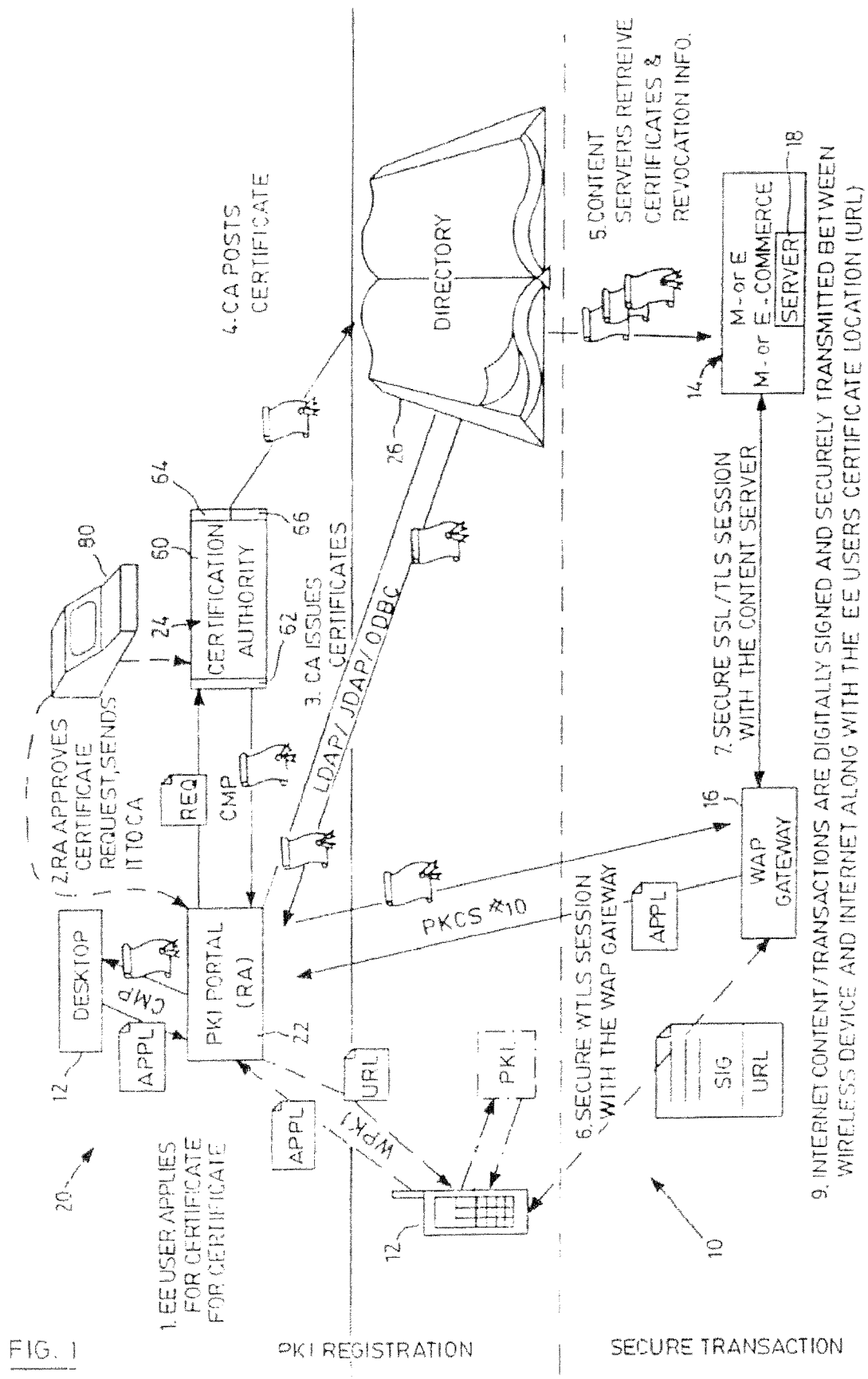
FIG. 1 is a diagrammatic representation of a network having a PKI and secure transaction

Although the invention has been described with reference to certain specific embodiments, various modifications thereof will be apparent to those skilled in the art without departing from the spirit and scope of the invention as outlined in the claims appended hereto. In the following description like numerals refer to like structures in the drawings.

Referring therefore to FIG. 1, a data communication network 10 provides communication capability between a pair of correspondents 12, 14. The network 10 is typically embodied as the Internet allowing one correspondent to send a message to and receive messages from other correspondents. In the embodiment shown in FIG. 1, the initiating correspondent 12 is shown as a client side wireless device such as a cellphone, pager or PDA communicating through a gateway 16 that implements a wireless application protocol (WAP).

The recipient correspondent 14 is shown as a server 18 associated with an e-commerce service, such as a financial institution or on-line shopping facility. It will be understood, however, that these are simply by way of example only and that other configurations of network and implementations other than the Internet are contemplated.

The nature of communications between the correspondents 12, 14 may require security to be implemented and accordingly a public key infrastructure (PKI), indicated at 20, is provided to the network 10.

The PKI 20 includes a portal or Registration Authority (RA) 22 to receive and process requests for a certificate from correspondent 12 and a certification authority (CA) 24. The PKI 20 provides a standards-based certificate issuance and management system (CIMS) platform for issuing, publishing and revoking public key certificates.

The CA 24 issues the certificate through the portal 22 to the correspondent 12 and posts information about the certificate to a directory 26 that can be accessed by other correspondents 14. The posted information may include a certificate revocation list (CRL) for determining the validity of a certificate received and copies of the issued certificates.

As an overview of the operation, therefore, the correspondent 12 who wishes to conduct a secure transaction with the correspondent 14 initially applies to the portal 22 for a certificate. The portal 22 processes the request in accordance with predetermined criteria and either rejects the request or, if approved, passes it to the CA 24. The CA 24 processes the request according to specific procedures and issues a certificate to the portal 22. The CA 24 also posts the certificate to the directory for subsequent use. Essentially the certificate is a message incorporating the public key of the correspondent 12 that is signed by the private key of the CA 24.

The portal 22 may either forward the certificate or, more usually, creates the certificate location URL and relays the URL to the correspondent 12 for inclusion in messages forwarded to the other correspondent 14.

The correspondent 12 initiates the transaction through the gateway 16 and includes a message signed with the private key of correspondent 12 that has been certified by the CA 24 and the URL of the certificate.

Upon receiving the message, the correspondent 14 retrieves the certificate and extracts the public key of the correspondent 12 using the public key of the CA 24. The message from the correspondent 12 is then verified using the extracted public key and the secure transaction completed.

It will be appreciated that the communication between the various parties in the network will be conducted in accordance standard protocols. Thus, in the example shown in FIG. 1, the correspondent 12 communicates with the portal 22 using a WPKI protocol and with the gateway 16 using a secure WTLS session; the portal 22 communicates with the CA 24 with a Certificate Management Protocol (CMP) and the gateway 16 communicates with the server 18 with a secure SSL/TLS session.

With other correspondents 12 included in the network such as a desktop, as indicated in FIG. 1, it is necessary to provide multiple protocol handling at the portal 22. Similarly, as shown in ghosted outline, one correspondent may be able to access multiple domains, each having a particular CA and purpose.

The portal 22 has three major roles in the PKI; $20_x$

Firstly, the PKI portal 22 handles the Registration Authority (RA) functions in the PKI, e.g., registers users, approves or denies requests made by end-users12 like requests for first-time certificates and renewal of expired certificates, etc.

Secondly, because of the multiple devices that may be used, the portal translates and relays access protocols/message formats on behalf of PKI enabled clients. The portal 22 is a networked server responsible for translating protocol requests, and relaying back protocol responses, between PKI clients 12 and the CA 24.

For example, in a typical application, WPKI requests from Wireless clients 12 are converted to CMP requests for the CA 24. Likewise, the PKI portal on behalf of the wireless client processes/converts responses, from the CA. Similarly, PKCS#10 requests from WAP servers/gateways 16 are converted to requests for the CA. Likewise, the PKI portal on behalf of the WAP server/gateway processes and converts responses, from the CA. Also, requests from desktop clients 12 using a CMP protocol are approved (or denied) and relayed to the CA. The PKI portal similarly relays responses from the CA 24 to the desktop client.

The main protocol-handling tasks of the portal 22 include:
Serving WML pages to the WAP clients to be able to request certificates
Serving HTML pages to WAP servers to be able to request certificates
Processing WAP-client WPKI certificate requests
Process WAP-server/gateway PKCS#10 certificate requests
Process desktop-client CMP certificate requests
Sign and forward approved requests to the CA
Public certificates for a WAP client to database/directory and return the certificate location as a Uniform Resource Locator (URL) to the WAP client
Relay copies of WAP server/gateway and desktop-client certificates to the WAP server/gateway and desktop-client respectively.

Thirdly, the portal 22 processes and schedules client certificate requests in accordance with the registration policies of the particular PKI in which it is used. The PKI portal 22 can access database/directories to manage state information.

Figure 2:
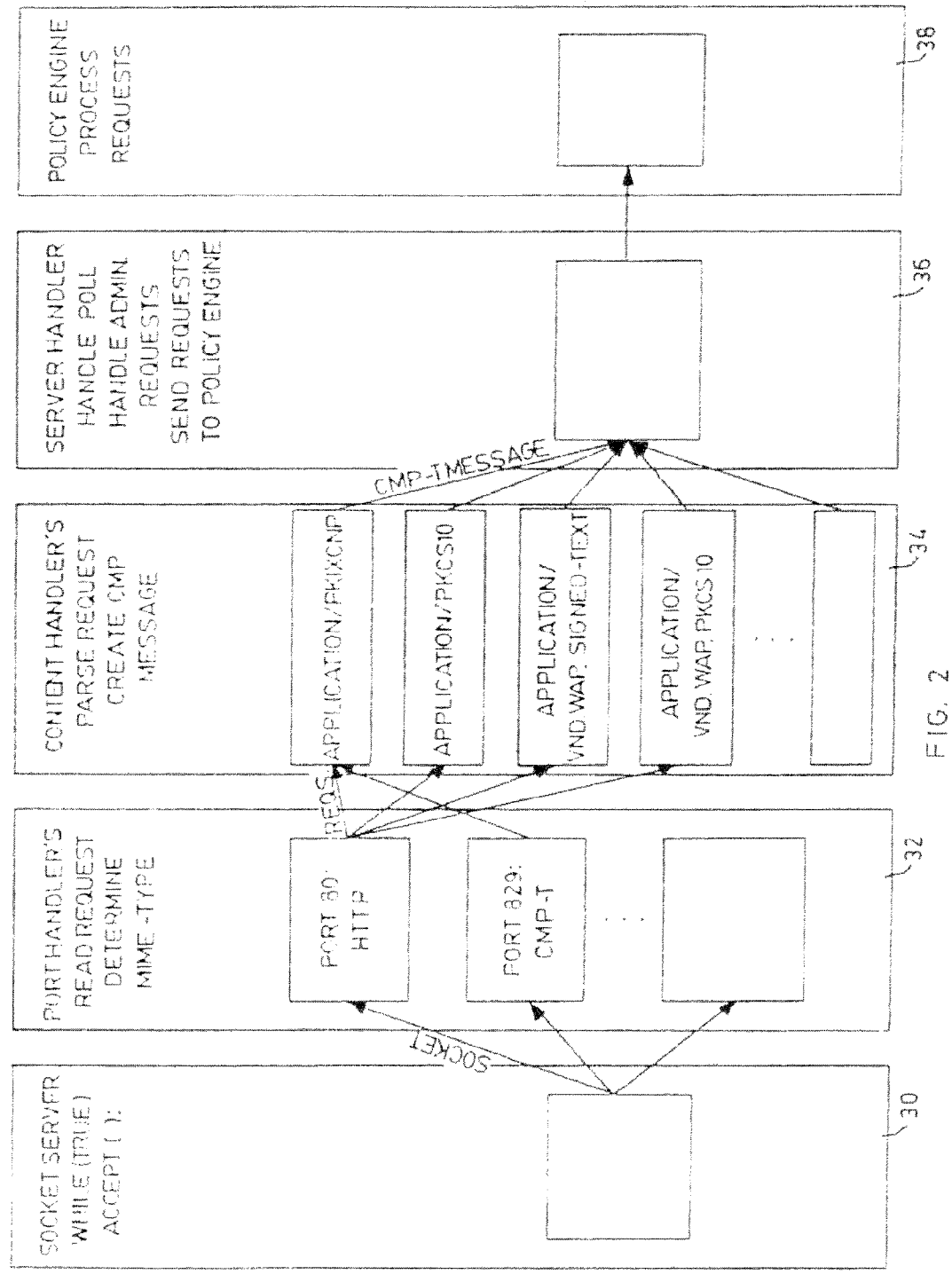
FIG. 2 is a schematic representation of the architecture of a portal.

As shown in FIG. 2, the general architecture for the portal 22 includes a socket server, 30, a port handler 32, a content handler 34, a serverhandler 36 and a policy engine 38.

The socketserver 30 is the main loop responsible for accepting connections from the various clients 12 and routing them to the appropriate port handlers 32. This is a multi-threaded architecture and is responsible for maintaining a pool of threads which allows the server to handle multiple requests from the clients.

The porthandlers 32 wait for connections on various ports from the socketservers 30. The port handlers 32 allow a single server to handle connections on multiple ports (e.g. CMP on port 829 as well as port 80).

After passing the port handler 32, content handlers 34 are responsible for recognizing the various formats from the clients and converting them to a CMP message. The content handlers 34 support the protocols that may be used in the PKI such as CMP (RFC 2510), PKCS-10 and WAP PKI messages. As required new translations can be written and added to the content handler 34.

The serverhandler 36 is responsible for managing the transaction state of pending requests. It is also responsible for managing the polling protocol in case the request is not approved directly. The server handler 36 is also responsible for firing the message events to the policy engine 36 and provides the supporting infrastructure for the same.

The policy engine 38 is responsible for managing the policies for the portal 22. This includes the administration function as well as the event mechanism for routing of various messages. New policies can be defined and uploaded to the policy engine 38 providing for an extremely flexible architecture.

Policies are the set of rules that define how a system is supposed to operate. Policies are driven by real-world needs and functional requirements. In the particular case of public-key infrastructure, there are several identifiable areas of protocol and system security policy that must be realized and enforced. These policies are typically driven by a variety of PKI-related protocol and security standards as well as requirements specific to the task at hand. For example, a certificate that is used to identify a person as a medical doctor and his or her right to issue digitally signed prescriptions would probably require a more complicated enrollment and vetting process than that for a certificate used to provide access to a consumer entertainment web site.

Policies start out in the form of written rules and specifications. These rules and specifications are then realized in software and hardware to implement the desired system.

In the preferred embodiment the policy engine 38 on the portal 22 will handle nearly all the processing required to produce a signed certificate, except for the actual signing of the certificate by the CA's signing key. This results in a more efficient and flexible system. It also allows for robust physical protection of the CA's signing key to be implemented independent of the physical requirements of a registration subsystem that may be widely distributed geographically so as to support both local and distributed registration authority topologies.

Typically, and as will be more fully described below, the policy engine 38 of the portal 22 implements a set of policies by which the correspondents 12 are uniquely and reliably authenticated before issuing certificates to them.

The policy engine 38 may be subdivided conceptually into different sets of policies each of which have different accessibility to an administrator. Typically the policy engine 38 will comprise a set of protocol policies, business related policies, and routing policies. Limited accessibility is provided to the protocol policies and, as noted above some may be made mandatory. The business policies of those that are most likely to be adjusted to take into account particular requirements of the particular business and are given a high level of accessibility. The routing policies receive and direct requests receive results and distributes the results. It will be noted from FIG. 3 that routing policies act as a node indicated at "Policy Engine" for all other policies so that interaction with the policy engine is controlled through a single routing policy.

Figure 3:
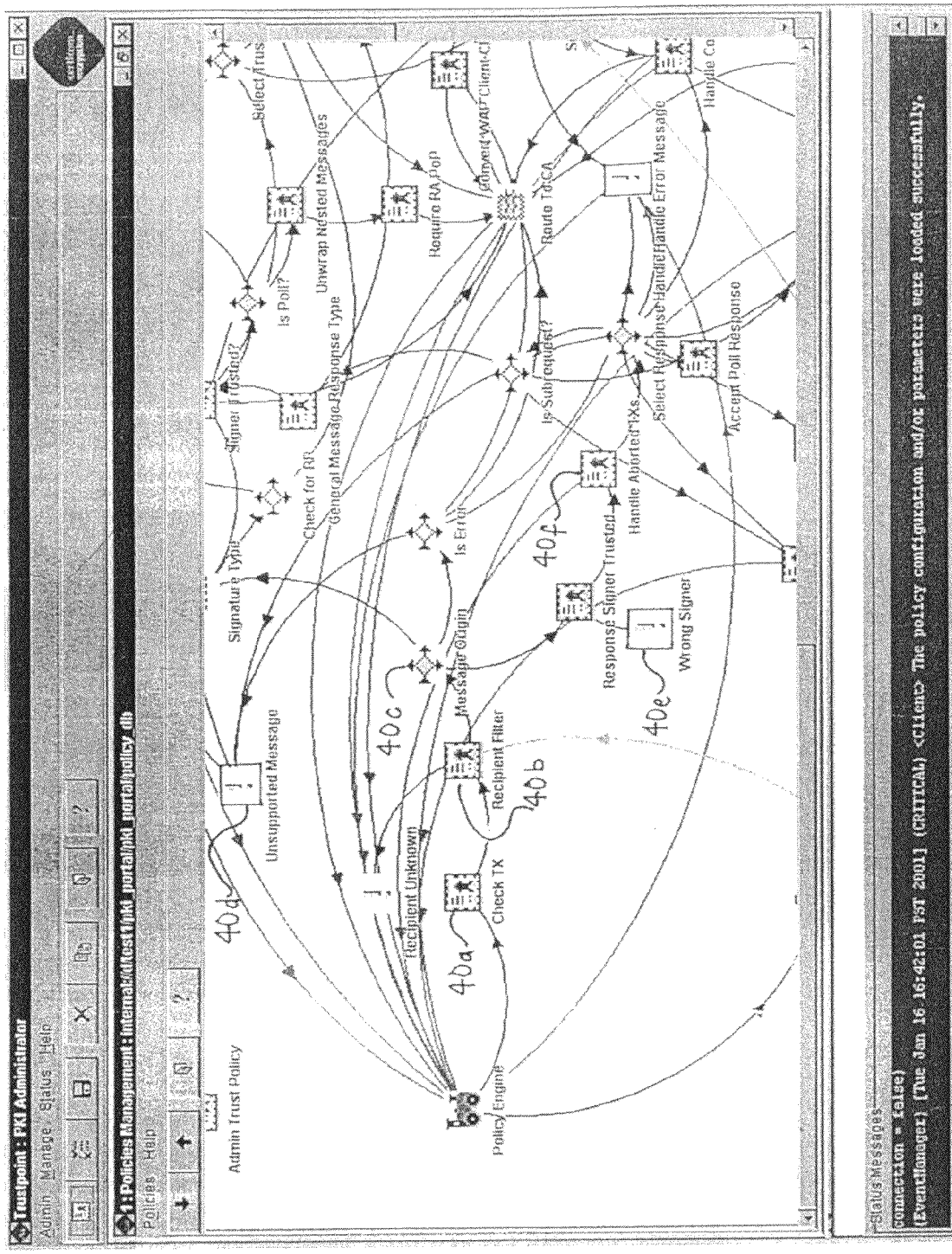
FIG. 3 is an portion of a graphical representation of a policy engine.

The graphical representation of FIG. 3 illustrates a portion of a policy engine implemented on the portal 22. The Registration and vetting policies are largely based on the types of entities to be issued certificates as well as the intended use and the reliance limits associated with those certificates. In FIG. 3, each of the policies is represented by a box 40 with interaction between the policies 40 being indicated by an arrowed line 42.

The policies that may be required at the portal 22 will differ from application to application but by way of example, may include within the routing policies to:
a) check transaction ($T_x$) indicated at 40a
b) check recipient (40b)
c) check origin (40c)
The policies also perform administration tasks such as
d) handling unsupported message (40d)
e) indicating wrong signor (40e)
f) handle aborted message (40f)

To provide flexibility and adaptability, each of the policies 40 described above are implemented in a powerful and highly-flexible manner using Java™ software components called JavaBeans™. Such components are configured to perform the discrete functions associated with the policy and generate a notification in response to a change of state. In the preferred embodiment, each policy "bean" is actually a piece of Java™$_{code}$ that fits the form of a software component interface template. Each policy "bean" implements a specific set of steps called a policy during system initialization, subject registration, certificate issuance, certificate publishing, certificate revocation and other certificate lifecycle and system maintenance processes.

As indicated by the arrowed links, 42, Policy JavaBeans™ are liked together in a variety of ways to realize a complete certificate issuance and management system. The links between the icons show possible routing paths for notification of a change of state during processing commonly referred to as an event. By clicking on an individual icon, 40, a system administrator can modify parameters associated with a particular policy. For example, by opening the "Recipient Filter" policy 40b an administrator can configure the policy parameters to specify the particular LDAP directory where a list of subscribers is maintained.

Each of the policy Java beans have an input interface 44, an output interface 46 and an executable code 48. The interfaces 44, 46 permit each of the beans 40 to communicate with one another according to standardized formats. The output 48 generates an event upon completion of a change of state and the input 46 "listens" for such events to initiate its own policy. If necessary, a translator nodule 50 may be interposed between beans 40 to map an output from one bean to the input format of an adjacent bean 40.

The policy manager 38, therefore, receives and processes the requests from a correspondent and determines whether they can be forwarded to the CA 24 for issuance of a certificate.

The CA 24 includes a policy manager 60, similar to the policy manager 38, a portal interface 62 for implementing a PKIX CMP certificate management protocols and interfaces 64, 66 for interfacing with supporting database and directory components through suitable protocols such as JDBC and JNDI standard API's. The policy manager 60 implements a set of policies 40 as Java beans functionally inter-connected as indicated as described above with respect to the engine 38. The policies may include those used on the portal 22 together with policies specific to the function of the CA.

Again, each of the policies 68 has an input 72, an output 74 and an executing code 76. Where necessary a translator is interposed between adjacent policies.

The policy manager 60, therefore, is functional to respond to a request for a certificate received from the portal 22, issue the certificate to the portal 22 and store the certificate in the directory 26.

Figure 4:
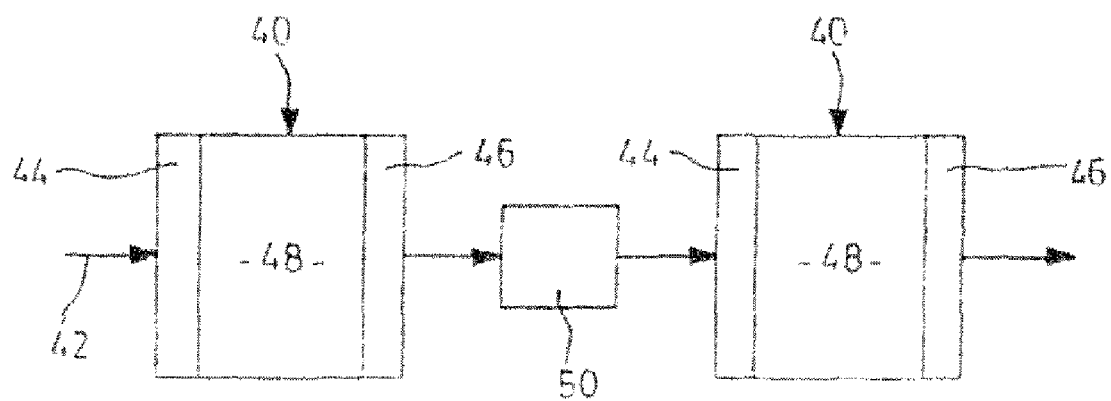
FIG. 4 is a schematic representation of the implementation of a pair of policies.
Figure 5:
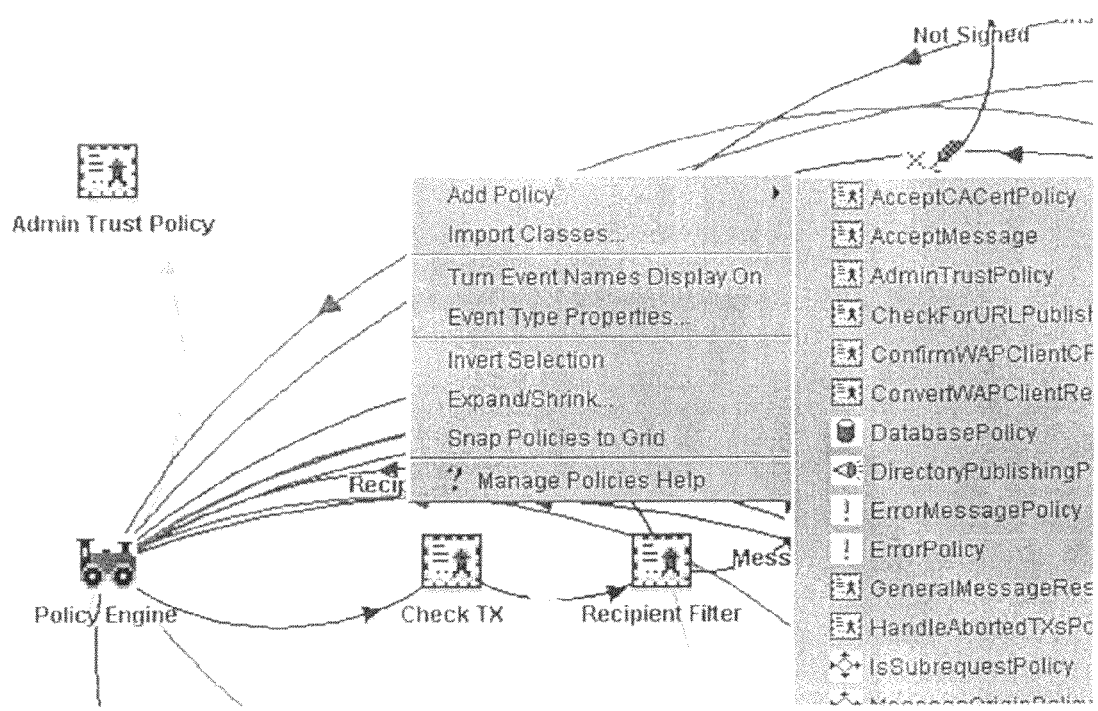
FIG. 5 is an enlarged view of a portion of the representation of FIG. 3 having a drop down menu for selection of a new policy.

It will be apparent that the architecture described above offers the capability of satisfying diverse requirements within the PKI. To take advantage of this versatility, the PKI is configured using a system configuration and maintenance interface between an Administrative Console 80 and the respective one of the servers. The PKI is configured from a suite of software including libraries of API's and beans and a utility for configuring each component of the PKI. The utility provides a selection of graphical and drop down menu driven interfaces as exemplified in FIG. 5 to configure and manage the policies associated with the PKI. Using such interfaces allows the policies to be added to the policy engine 38, 60, or, by clicking on the policy, the policy modified. Typically, the portal 22 and the CA 24 will be supplied as separate computer readable media, typically CD ROMs allowing each portal 22 and CA 24 to be configured using the visual manipulation tool in the utility as seen on the GUI of FIGS. 3 and 4.

Utilizing the visual development tool incorporated with the utility, the required protocols may be implemented and the Java beans defining the policy 40 engine, 68 modified to suit the particular application. The Administrative Console 80 through a GUI interface provides access to the graphical representation of the portal 22 or CA 24 and to a library of beans that may be "dropped" into the policy engine to provide the required functionality.

Figure 6:
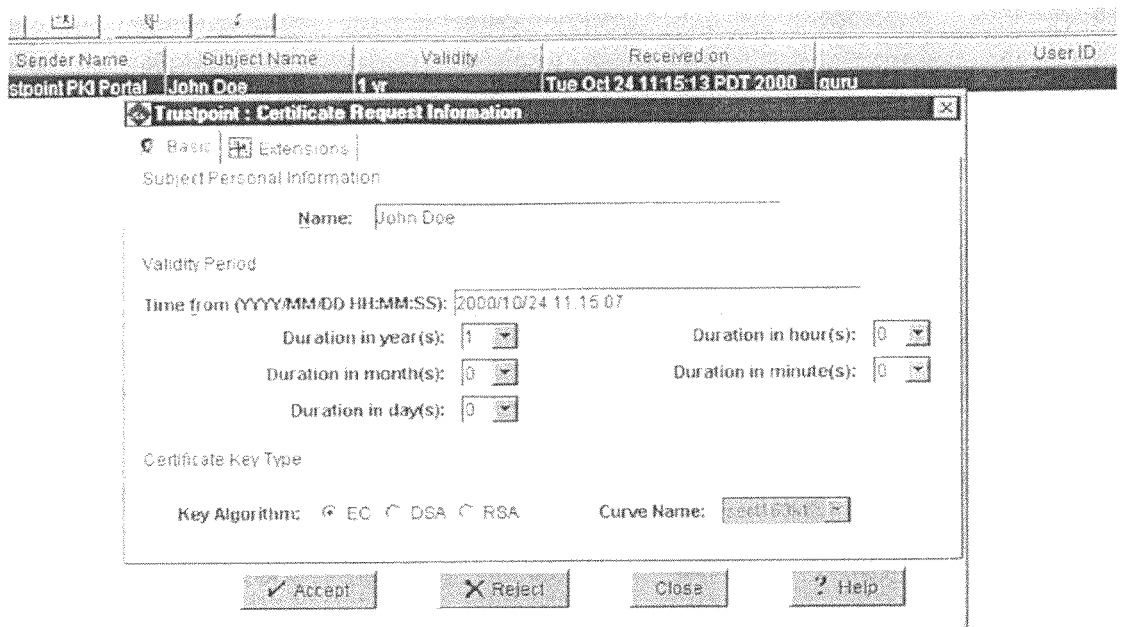
FIG. 6 is a view of a screen presented for a certificate request.

The utility, stored on the portal 22 and CA 24 also provides GUI interfaces for an administrator to facilitate management of the PKI, such as a request for a certificate as shown schematically in FIG. 6. Additional functionality may be provided by providing toolkits to facilitate the generation of new policies.

Among the tool kits included in the suite are:

a) ASN.1 Toolkit

The ITU X.509 standard specifies the contents of digital certificates using Abstract Syntac Notation (ASN.1). ASN.1 is an international standard defined by the ISO/CCITT' for defining high-level protocol information is widely used for the specification of communications protocols. The ASN.1 standard is comprised of two distinct portions: (1) the language for defining protocol data units and (2) the encoding and decoding rules for converting the protocol units for transmission over the wire.

The ASN.1 toolkit provides for the handling of the basic ASN.1 types as well as the encoding/decoding of ASN.1 structures.

The following tables summarize the fundamental ASNI-.data types as well as the encoding/decoding schemes that should be supported.

Primitive ASN.1 Types

| Type | Supported | Comments |
|---|---|---|
| INTEGER | X | Supports encoding of very large integers use for cryptography |
| BITSTRING | X | |
| BOOLEAN | X | |
| ENUMERATED | X | |
| OCTET STRING | X | |
| OBJECT IDENTIFIER | X | |
| IA5String | X | |
| NumericString | X | |
| NULL | X | |
| Printable String | X | |
| UTCTime | X | Does automatic conversion of time into local time zone |
| GeneralTime | X | Does automatic conversion of time into local time zone |
| REAL | X | |
| T61 String | X | |
| UTF8String | X | |
| VisibleString | X | |
| GeneralString | X | |
| Any | X | Supports standalone ANY, not recommend for use |

Structured ASN.1 Types

| Type | Supported | Comments |
|---|---|---|
| Enveloped | X | Used to support tagged types not contained within other ASN.1 structures |
| SET | X | |
| SET OF | X | |

-continued

| Type | Supported | Comments |
|---|---|---|
| SEQUENCE OF | X | |
| CHOICE | X | |

Encoding/Decoding Schemes

| Type | Supported | Comments |
|---|---|---|
| Basic Encoding Rules (BER) | X | |
| Distinguished Encoding Rules (DER) | X | |
| XML Encoding Rules (XER) | | For future use |
| Packed Encoding Rules (PER) | | Mostly seen in telecomm industry |
| Canonical Encoding Rules (CER) | | Very little use seen so far |

The ASN.1 toolkit utilizes the dynamic linking capability of JAVA™ to resolve ANY DEFINED BY. The ASN.1 toolkit uses an ASCII configuration file to store object identifier-to-class mappings. This allows for support for new object identifiers without requiring recompilation.

b) Cryptography Toolkit

This toolkit provides low-level cryptography primitives such as key generation, hash (message digest) functions, message digest, encryption/decryption, key exchange, etc. These functions are provided as a JAVA™ *Cryptography Package Provider* confirming to the *Java Security Architecture.*

Hash Functions

| Algorithm | Supported | Comments |
|---|---|---|
| MD5 | X | Rivest, R., "The MD5 Message-Digest Algorithm", RFC 1321, April 1992 |
| SHA | X | Obsolete. Superceded by FIPS PUB 180-1. Included for compatibility with legacy systems only. |
| SHA-1 | X | NIST, FIPS PUB 180-1: Secure Hash Standard, April 1995. |

Message Authentication Code (MAC) Functions

| Algorithm | Supported | Comments |
|---|---|---|
| HMAC-MD5 | X | H. Krawczyk, et. Al., "MHAC: Keyed-Hashing for Message Authentication:, IETF RFC 2104, February 1997 |
| HMAC-SHA-1 | X | H. Krawczyk, et. Al., "HMAC: Keyed-Hashing for Message Authentication", IETF RFC 2104, February 1997 |

Digital Signing/Verification

| Algorithm | Supported | Comments |
|---|---|---|
| DSA (X9.57 OID) | X | See RFC 2459 |
| DSA (O1W OID) | X | Object identifier not PKIX compliant. Included for legacy certificate support. Encoding of parameters is different |
| RSA (with MD5) | X | See RFC 2459 (per PKCS #1) |
| RSA (with SHA-1) | X | See RFC 2459 (per PKCS #1) |

-continued

| Algorithm | Supported | Comments |
|---|---|---|
| RDSA | X | FIPS 186-1 |
| ECDSA | X | |

Encryption Algorithms

| Algorithm | Supported | Comments |
|---|---|---|
| DES | X | FIPS PUB 81: ECB and CBC Mode |
| Triple DES | X | PKCS#5 (DES-EDE3-CBC-Pad, RFC 1423) ANSI X9.52 |
| RC2 ® | X | RFC 2268 |

Key Agreement Algorithms

| Algorithm | Supported | Comments |
|---|---|---|
| Diffie-Hellman | X | RFC 2631/(based on ANSI x9.42 Draft) | c) PKIX Message Toolkit

This toolkit provides functions to create and manipulate all of the PKIX-compliant messages defined in *Certificate Management Protocols (RFC 2510)*, *Certificate Request Message Format (CRMF) (RFC 2511)*, and *PKCS#10: Certification Request Syntax (RFC 2314).*

The toolkits provide both "low-level" APIs, with direct access to ASN.1 structures, and "high-level" API, that hide much of the detail of the underlying ASN.1 structures. Applications can choose which level of access they require. For most simple client applications, the higher-level APIs are quite adequate. Server applications, on the other hand will generally require the more fine-grained access afforded by the low-level API's. The major difference between the two sets of APIs is that the high-level API's assign semantic meaning to the data field, whereas the low-level APIs are used only for data manipulation.

The PKIX Messages Supported by the Low-Level APIs are:

| Message Type | Supported | Comments |
|---|---|---|
| Initial Certificate Request | X | |
| Initial Certificate Response | X | |
| Certificate Response | X | |
| PKCS#10 Certificate Request | X | |
| Proof-of-Possession (POP) Challenge | X | |
| Proof-of-Possession (POP) Response | X | |
| Key Update Request | X | |
| Key Update Response | X | |
| Revocation Request | X | |
| Revocation Response | X | |
| Cross Certificate Request | X | |
| Cross Certificate Response | X | |
| CA Key Update Announcement | X | |
| Certificate Announcement | X | |
| Revocation Announcement | X | |
| CRL Announcement | X | |
| Confirmation | X | |
| Nested Message | X | |
| General Message | X | |
| General Response | X | |
| Error Message | X | |

The PKIX Messages Supported by the High-Level APIs are:

| Message Type | Supported | Comments |
|---|---|---|
| Initial Certificate Request | X | |
| Initial Certificate Response | X | |
| Certificate Request | X | |
| Certificate Response | X | |
| Revocation Request | X | |
| Revocation Response | X | |
| Confirmation | X | |
| General Message | X | |
| General Response | X | |
| Error Message | X | | d) PKIX Protocol Toolkit
This Toolkit Provides Two Features:
1. Encoding of the PKIX messages into messages suitable for transmission.
2. Transfer of the PKIX messages over different transport protocols such as HTTP or TCP.
The toolkit should support two transport protocols:

| Transport Protocol | Supported | Comments |
|---|---|---|
| TCP | X | Certificate management Protocols (RFC 2510) |
| HTTP | X | Using HTTP as a Transport Protocol for CMP (PKIX Draft) |
| CMC | | Certificate Management Messages over CMC (PKIX Draft) We will consider supporting based on demand and draft stability.) |

Note:
the PKIX Protocol Toolkit allows for application to switch between different transport protocols in a transparent manner.

e) PKCS Toolkit
This toolkit is a set of Java™ packages that implement the various *Public Key Cryptography Standards* (*PKCS*) and allow the application developer to create and manipulate the underlying data structures.

| Standard | Supported | Comments |
|---|---|---|
| PKCS#1 | X | RSA Encryption Standard. Provides encoding/decoding of ASN.1 structures |
| PKCS#2 | X | PKCS#2 and PKCS#4 have been incorporated into PKCS#1 |
| PKCS#3 | X | Diffie-Hellman Key-Agreement Standard |
| PKCS#4 | X | PKCS#2 and PKCS #4 have been incorporated into PKCS#1 |
| PKCS#5 | X | Password-based Cryptography Standard |
| PKCS#6 | X | Extended-certificate syntax Standard |
| PKCS#7 | X | Cryptographic Message Syntax Standard Content Types Supported: Enveloped Data, Encrypted Data and Signed Data |
| PKCS#8 | X | Private-Key Information Syntax Standard |
| PKCS#9 | X | Selected Attribute Types |
| PKCS#10 | X | Certification Request Syntax Standard |
| PKCS#11 | X | Cryptographic Token Interface Standard ("Cryptoki") Smart Cards will be supported through the OpenCard Framework or via JNI-facilitated native PKCS# 11 APIs on host platform |
| PKCS#12 | X | Personal Information Exchange Syntax Standard for supporting Personal Security Environments (PSE) |

To obtain a certificate the correspondent 12 directs a request through a browser to the portal 22. The portal 22 makes available a key generation applet that is loaded to the correspondent 12 and steps the correspondent through the creation of the session private key and the collection of other information needed for completing a certificate request.

The correspondent 12 then forwards the completed request to the portal 22. Upon receipt of the request, the portal 22 forwards it to the policy engine 38 where the selected policies are reviewed. Each policy provides an event to listening beans, and, if approved, the request is forwarded to the CA 24. If necessary, the request may be forwarded for human intervention for manual approval through the console 80. This can be done by downloading the request to a portal client where it may be reviewed, approved, modified or rejected by the designated person.

The portal client returns the request to the portal 22 from where, if approved, it is forwarded to the CA 24. The CA 24 processes its through it own policies for final approval and signing. If rejected, it is returned via the administration policies to the correspondent 12. During this process all of the transactions between the portal 22, its clients and the CA 24 are signed, allowing for an audit trail in case of dispute or audit purposes. The configuration of the policy engine as software components, e.g. Java beans, provides the administrator with a highly flexible capability for customizing a PK1 policy engine best suited to the needs of the business.

Because of the flexibility offered by the architecture, it is possible that an administrator may amend the policies or the configuration of the portal 22 or CA: 24 in an undesirable manner. To enhance the security and provide an audit trail it is possible for the individual policies to be digitally signed and for the configured policy engine also to be digitally signed. Any subsequent amendment or adjustment of the policy engine would then be evident upon inspection of the digitally signature.

Security may also be enhanced by making certain of the policies mandatory in any policy engine or by performing mandatory checks upon the configured policy engine prior to utilization. Such check could be form by feeding test data to the policy engine and obtaining predictable responses. For example, a policy checking for small subgroup attacks may be required and its presence validated by feeding data susceptible to such an attack.

A particular benefit utilized within the configuration and the policy engine is the ability to dynamically change the parameters and class of a policy as to change the configuration of policies within the policy engine itself without inhibiting the operations of server. To achieve this, the administrator signs a request to either the portal or the CA 24 to change e.g. a parameter in one of the policies. The receipt of the request inhibits further processing a certificate requests by either the portal 22 or CA 24 is updated. The policy engine completes the processing of any transactions currently being handled and then performs the update or change. Once completed, the policy engine is again able to receive and process the requests.

Selected beans may also be provided with a historical check to ensure that looping between adjacent policies will be detected and inhibited.

The presentation of the representation of the policy engine may be enhanced by imparting characteristics to the representation of the beans and links during configuration. Links initiated by common event may be identified with a particular color and different colors used for different events. Similarly the events themselves may be colored to aid in visual distinction and different shapes be accorded to the graphical representations of the events to further differentiate. The representation of the lines linking adjacent beans may be modified so as to curve around other representations and events and the names of events may be selectively displayed or hidden as required.

Figure 7:
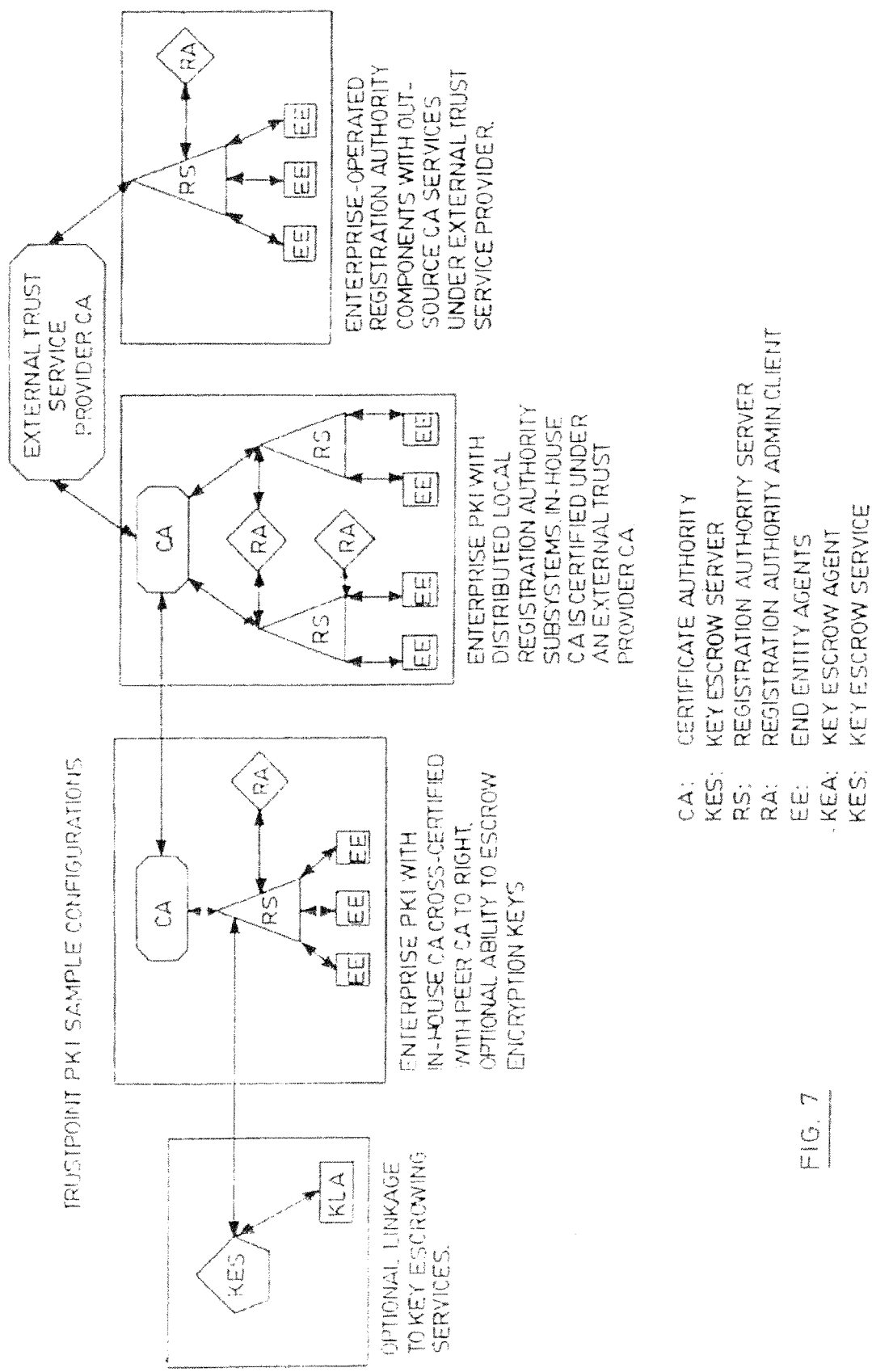
FIG. 7 is a representation of different PKI Topographies.

As shown in FIG. 7 the flexibility offered by the separation of RA's and CA's and the independence of the policies implemented allows a number of PK12 topographies to be utilized.

The embodiments of the invention in which an exclusive property or privilege is claimed are defined as follows:

1. A method of generating certificates used in communication across a network, the method comprising:
receiving at a portal on a server side of a public key infrastructure a request for a certificate from a client;
said portal scheduling said request and processing said request using a first policy engine in accordance with a first set of predefined protocols and thereby offloading at least one processing task from a certification authority, said portal being communicably interposed between said client and said certification authority; said first policy engine allowing policies to be defined and modified; wherein said policies comprise a set of rules that define how a system operates;
said portal determining whether to approve or deny said request according to said first set of predefined protocols; wherein said portal is configured to provide multiple protocol handling to accommodate different client types and is further configured to translate at least one protocol request and relay back at least one protocol response between said client and said certification authority;
for an approved request, said portal requesting a certificate from said certification authority;
said portal receiving from said certification authority said certificate; said certificate having been generated by said certification authority according to a second set of predefined policies using a second policy engine to complete processing in generation of said certificate; and
said portal providing said certificate to said client;
wherein said first policy engine includes at least one policy configured as a software component to perform at least one discrete function associated with said at least one policy and to generate a notification in response to a change in state upon completion of said at least one policy to enable said policies of said first policy engine to be defined and modified to provide flexibility in said public key infrastructure.

2. The method according to claim 1 wherein said at least one policy is responsive to notification of a change in state from another policy in said first policy engine.

3. The method according to claim 1 wherein said at least one policy is implemented using software components, wherein policy beans associated with said software components correspond to said discrete functions.

4. The method according to claim 1 wherein said at least one policy is digitally signed to enhance security.

5. The method according to claim 1 further comprising enabling use of at least one toolkit to facilitate generation of new policies.

6. The method according to claim 1 wherein said first policy engine is adapted to enable new policies to be defined and uploaded thereto.

7. The method according to claim 1 wherein said portal comprises a Registration Authority and wherein said first set of predefined protocols includes all processing to produce said certificate, with the exception of policies related to the signing of said certificate.

8. A non-transitory computer readable medium having stored thereon computer readable instructions for performing a method of generating certificates used in communication across a network, said computer readable instructions comprising instructions for:
receiving at a portal on a server side of a public key infrastructure a request for a certificate from a client;
said portal scheduling said request and processing said request using a first policy engine in accordance with a first set of predefined protocols and thereby offloading at least one processing task from a certification authority, said portal being communicably interposed between said client and said certification authority; said first policy engine allowing policies to be defined and modified; wherein said policies comprise a set of rules that define how a system operates;
said portal determining whether to approve or deny said request according to said first set of predefined protocols; wherein said portal is configured to provide multiple protocol handling to accommodate different client types and is further configured to translate at least one protocol request and relay back at least one protocol response between said client and said certification authority;
for an approved request, said portal requesting a certificate from said certification authority;
said portal receiving from said certification authority said certificate; said certificate having been generated by said certification authority according to a second set of predefined policies using a second policy engine to complete processing in generation of said certificate; and
said portal providing said certificate to said client;
wherein said first policy engine includes at least one policy configured as a software component to perform at least one discrete function associated with said at least one policy and to generate a notification in response to a change in state upon completion of said at least one policy to enable said policies of said first policy engine to be defined and modified to provide flexibility in said public key infrastructure.

9. The non-transitory computer readable medium according to claim 8 wherein said at least one policy is responsive to notification of a change in state from another policy in said first policy engine.

10. The non-transitory computer readable medium according to claim 8 wherein said at least one policy is implemented using software components, wherein policy beans associated with said software components correspond to said discrete functions.

11. The non-transitory computer readable medium according to claim 8 wherein said at least one policy is digitally signed to enhance security.

12. The non-transitory computer readable medium according to claim 8 wherein said instructions further comprise instructions for enabling use of at least one toolkit to facilitate generation of new policies.

13. The non-transitory computer readable medium according to claim 8 wherein said first policy engine is adapted to enable new policies to be defined and uploaded thereto.

14. The non-transitory computer readable medium according to claim 8 wherein said portal comprises a Registration Authority and wherein said first set of predefined protocols includes all processing to produce said certificate, with the exception of policies related to the signing of said certificate.

15. A system to administer issuance and maintenance of certificates requested by one or more clients and used by said one or more clients in communications across a network, said system comprising a portal communicably interposed between a certification authority and said one or more clients in a public key infrastructure, said portal comprising at least one processor configured for:

receiving at said portal a request for a certificate from a client;

scheduling said request and processing said request using a first policy engine in accordance with a first set of predefined protocols and thereby offloading at least one processing task from said certification authority; said first policy engine allowing policies to be defined and modified; wherein said policies comprise a set of rules that define how a system operates;

determining whether to approve or deny said request according to said first set of predefined protocols;

for an approved request, requesting a certificate from said certification authority;

receiving from said certification authority said certificate; said certificate having been generated by said certification authority according to a second set of predefined policies using a second policy engine to complete processing in generation of said certificate; and providing said certificate to said client;

wherein said portal is further configured to provide multiple protocol handling to accommodate different client types and to translate at least one protocol request and relay back at least one protocol response between said client and said certification authority; and wherein said first policy engine includes at least one policy configured as a software component to perform at least one discrete function associated with said at least one policy and to generate a notification in response to a change in state upon completion of said at least one policy to enable said policies of said first policy engine to be defined and modified to provide flexibility in said public key infrastructure.

16. The system according to claim 15 wherein said at least one policy is responsive to notification of a change in state from another policy in said first policy engine.

17. The system according to claim 15 wherein said at least one policy is implemented using software components, wherein policy beans associated with said software components correspond to said discrete functions.

18. The system according to claim 15 wherein said at least one policy is digitally signed to enhance security.

19. The system according to claim 15 wherein said first policy engine is adapted to enable new policies to be defined and uploaded thereto.

20. The system according to claim 15 wherein said portal comprises a Registration Authority, and wherein said first set of predefined protocols includes all processing to produce said certificate, with the exception of policies related to the signing of said certificate.

* * * * *